United States Patent
Bodenmüller et al.

(10) Patent No.: US 10,773,433 B2
(45) Date of Patent: Sep. 15, 2020

(54) CARTRIDGE, CORE, MOLD AND METHOD OF MANUFACTURING A CARTRIDGE

(71) Applicant: Sulzer Mixpac AG, Haag (CN)

(72) Inventors: Tobias Bodenmüller, Eriskirch (DE); Richard Lavelanet, Balgach (CH); Victor Clemens, Buchs (CH)

(73) Assignee: SULZER MIXPAC AG, Haag (CH)

( * ) Notice: Subject to any disclaimer, the term of this patent is extended or adjusted under 35 U.S.C. 154(b) by 0 days.

(21) Appl. No.: 16/314,544

(22) PCT Filed: Jun. 27, 2017

(86) PCT No.: PCT/EP2017/065901
§ 371 (c)(1),
(2) Date: Dec. 31, 2018

(87) PCT Pub. No.: WO2018/002080
PCT Pub. Date: Jan. 4, 2018

(65) Prior Publication Data
US 2019/0322018 A1    Oct. 24, 2019

(30) Foreign Application Priority Data
Jul. 1, 2016   (EP) .................................... 16177608

(51) Int. Cl.
*B29C 45/14*      (2006.01)
*B29C 45/26*      (2006.01)
(Continued)

(52) U.S. Cl.
CPC .. *B29C 45/14598* (2013.01); *B29C 45/14065* (2013.01); *B29C 45/14418* (2013.01);
(Continued)

(58) Field of Classification Search
CPC ........ B29C 45/14598; B29C 45/14065; B29C 45/14418; B29C 45/261; B29C 45/36; B65D 83/0072; B29L 2031/712
(Continued)

(56) References Cited

U.S. PATENT DOCUMENTS 3,417,899 A    12/1968   Brown
4,687,663 A    8/1987    Schaeffer
(Continued)

FOREIGN PATENT DOCUMENTS

CA    2942622 A1    10/2015
JP    6-53469 A     2/1994
(Continued)

OTHER PUBLICATIONS

International Search Report dated Aug. 30, 2017 in corresponding International Application No. PCT/EP2017/065901, filed Jun. 27, 2017.
(Continued)

*Primary Examiner* — Patrick M. Buechner
*Assistant Examiner* — Michael J. Melaragno
(74) *Attorney, Agent, or Firm* — Global IP Counselors, LLP

(57) ABSTRACT

A cartridge for a medium to be dispensed includes a head part having a dispensing outlet and a film forming a cartridge wall, with the film surrounding a cartridge chamber for the medium to be dispensed, extending at least partially (along an axial extension) in a longitudinal direction of the cartridge and having a front end being connected to the head part. The film is preferably a multilayer film having at least two layers formed from different materials, and the front end of the film is sealingly and non-releasably embedded in the
(Continued)

head part of the cartridge, so that an end face of the front end of the film is covered, in particular completely covered, by the head part.

10 Claims, 6 Drawing Sheets

(51) Int. Cl.
*B29C 45/36* (2006.01)
*B65D 83/00* (2006.01)
*B29L 31/00* (2006.01)

(52) U.S. Cl.
CPC ............ *B29C 45/261* (2013.01); *B29C 45/36* (2013.01); *B65D 83/0072* (2013.01); *B29L 2031/712* (2013.01)

(58) Field of Classification Search
USPC ........................................................ 222/325
See application file for complete search history.

(56) References Cited

U.S. PATENT DOCUMENTS

| | | | |
|---|---|---|---|
| 5,002,623 A | 3/1991 | Steer et al. | |
| 5,123,571 A * | 6/1992 | Rebeyrolle | B65D 83/62 222/105 |
| 5,184,757 A | 2/1993 | Giannuzzi | |
| 5,360,146 A | 11/1994 | Ikushima | |
| 5,586,672 A * | 12/1996 | Schneider | B65D 35/12 215/250 |
| 5,593,066 A | 1/1997 | Konuma et al. | |
| 5,647,510 A | 7/1997 | Keller | |
| 5,993,720 A | 11/1999 | Konuma et al. | |
| 6,129,244 A | 10/2000 | Horth | |
| 6,305,577 B1 * | 10/2001 | Fillmore | B05B 11/0043 222/105 |
| 6,308,862 B1 * | 10/2001 | Fillmore | B05B 11/0043 222/105 |
| 6,334,548 B1 | 1/2002 | Ichikawa et al. | |
| 6,578,738 B1 * | 6/2003 | Keller | B05C 17/0052 222/105 |
| 6,644,509 B1 * | 11/2003 | Bublewitz | B05C 17/00506 222/88 |
| 6,971,787 B2 | 12/2005 | Botrie et al. | |
| 7,137,531 B2 | 11/2006 | Arghyris et al. | |
| 7,144,170 B2 | 12/2006 | Parks et al. | |
| 7,815,384 B2 | 10/2010 | Parks et al. | |
| 8,690,012 B2 | 4/2014 | Stoeckli et al. | |
| 9,555,928 B2 * | 1/2017 | Ettlin | B05C 17/00553 |
| 9,878,335 B2 * | 1/2018 | Muller | B01F 5/0609 |
| 9,901,946 B2 * | 2/2018 | Ettlin | B05C 17/01 |
| 9,975,139 B2 * | 5/2018 | Turner | B05C 17/012 |
| 10,434,528 B1 * | 10/2019 | Seiler | B05B 11/0081 |
| 10,464,099 B2 * | 11/2019 | Clemens | A61C 5/64 |
| 10,518,958 B2 * | 12/2019 | Senn | B65D 83/0005 |
| 10,562,064 B2 * | 2/2020 | Lavelanet | B05C 17/00506 |
| 2005/0109796 A1 | 5/2005 | Bourque et al. | |
| 2005/0138792 A1 | 6/2005 | Black et al. | |
| 2006/0021996 A1 | 2/2006 | Scott et al. | |
| 2006/0188314 A1 | 8/2006 | Hunter et al. | |
| 2009/0084815 A1 * | 4/2009 | Paetow | B65D 81/3244 222/94 |
| 2013/0221028 A1 * | 8/2013 | Robinson | B05C 17/00513 222/94 |
| 2014/0158717 A1 * | 6/2014 | Ettlin | B05C 17/01 222/327 |
| 2014/0174037 A1 | 6/2014 | Frey | |
| 2014/0203023 A1 * | 7/2014 | Ettlin | B05C 17/00553 220/507 |
| 2015/0102132 A1 * | 4/2015 | Muller | B01F 5/0609 239/335 |
| 2015/0108251 A1 * | 4/2015 | Muller | B05B 7/2497 239/304 |
| 2017/0216874 A1 | 8/2017 | Turner et al. | |
| 2018/0229260 A1 * | 8/2018 | Lavelanet | B05C 17/00506 |
| 2019/0193919 A1 * | 6/2019 | Turner | B65D 83/0005 |
| 2019/0241351 A1 * | 8/2019 | Bodenmuller | B29C 33/76 |
| 2019/0322018 A1 * | 10/2019 | Bodenmuller | B29C 45/14418 |
| 2020/0101488 A1 * | 4/2020 | Bodenmuller | B01F 15/0087 |
| 2020/0102122 A1 * | 4/2020 | Seiler | B65D 47/06 |

FOREIGN PATENT DOCUMENTS

| | | |
|---|---|---|
| JP | 6-336254 A | 12/1994 |
| JP | 2001225853 A | 8/2001 |
| WO | 2009/113502 A1 | 9/2009 |

OTHER PUBLICATIONS

Extended European Search Report dated Dec. 23, 2016 in corresponding European Patent Application No. 16177608.3, filed Jul. 1, 2016.

* cited by examiner

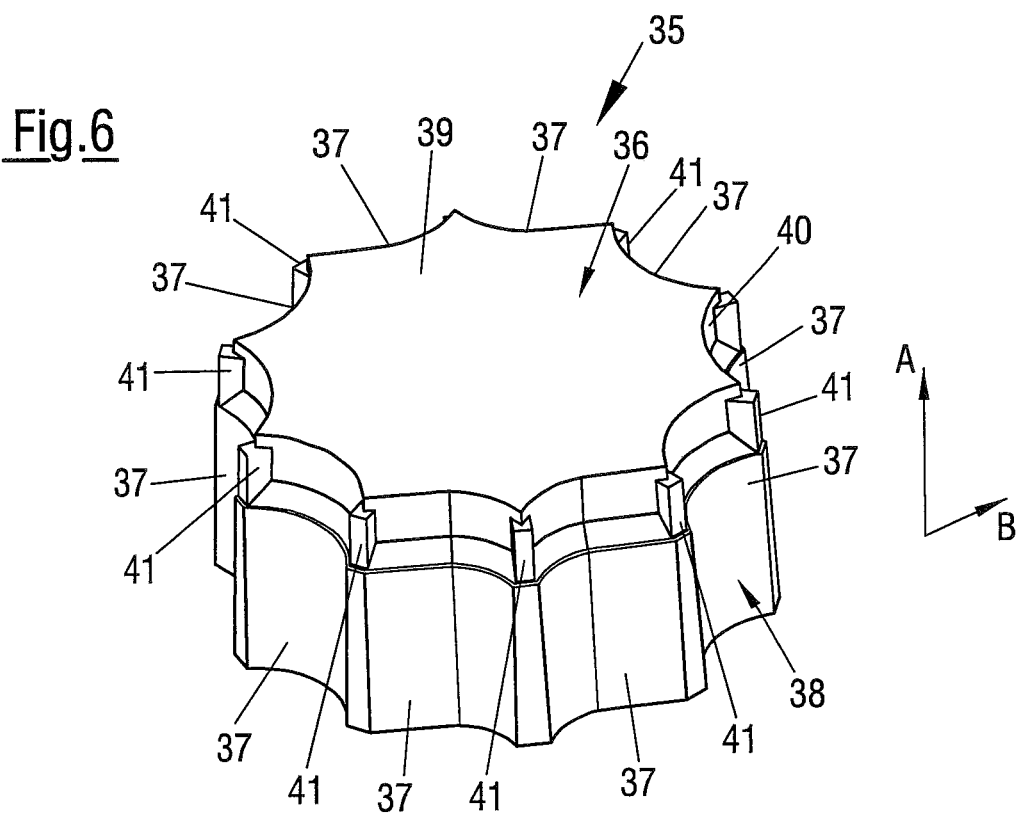
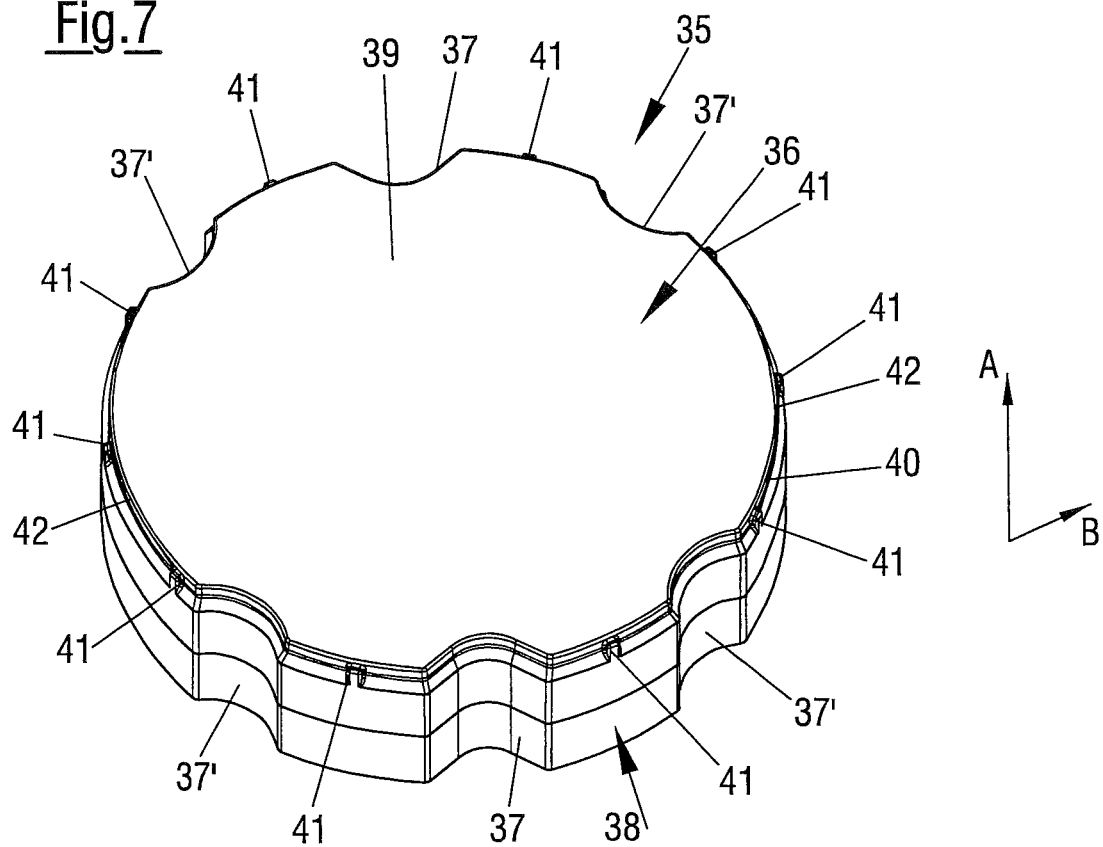

CARTRIDGE, CORE, MOLD AND METHOD OF MANUFACTURING A CARTRIDGE

CROSS-REFERENCE APPLICATION

This application is a U.S. National Stage Application of International Application No. PCT/EP2017/065901, filed Jun. 27, 2017, which claims priority to European Application No. 16177608.3, filed Jul. 1, 2016, the contents of each of which is hereby incorporated herein by reference.

BACKGROUND

Field of Invention

The present invention relates to a cartridge for a medium to be dispensed comprising a head part having a dispensing outlet and a film forming a cartridge wall, with the film bounding a cartridge chamber for the medium to be dispensed, extending at least partially in a longitudinal direction of the cartridge and having a front end that is connected to the head part. The invention further relates to a core for a mold for molding a head part, to a mold for molding a head part and to a method of manufacturing a cartridge.

Background Information

In the industrial sector, in the construction industry, for example of buildings, and also in the dental sector, cartridges are frequently used to store liquid flowable, frequently pasty or viscous to highly viscous substances and to dispense them for the respective application as required. Examples for such substances are joint sealing compounds, compounds for chemical dowels or chemical anchors, adhesives, pastes or impression materials in the dental sector. These cartridges are usually produced from plastic and are manufactured in an injection molding process.

A distinction is made between single-component systems in which the material to be dispensed is only made of one component and two-component or multicomponent systems in which at least two different components are stored in separate chambers of the same cartridge or in separate cartridges, wherein the components are intimately mixed on dispensing by means of a dynamic or static mixing apparatus. Examples for this are two-component adhesives or chemical dowels which only harden after the mixing of the two components. Two-component systems are in particular also used in the industrial sector for paints which are often used to generate functional protective layers such as for corrosion protection.

For reasons of environmental protection, film cartridges are increasingly being used. In contrast to regular cartridges which are completely produced from plastic in an injection molding process, at least parts of film cartridges are designed as a film. Usually the cartridge wall(s) bounding the cartridge chamber(s) is/are made of a film which is connected to a head part made of rigid material, e.g. plastic, comprising the dispensing outlet. This has several advantages. On the one hand, the unfilled film cartridges can be stored and transported in a collapsed state from the cartridge manufacturers to the manufacturers of the filling materials (media) who then take care of the filling of the empty cartridges. Only after being filled the film cartridge is in its expanded state which is comparable in size to a regular non-collapsible cartridge. This means that the necessary space for storage and for transportation can be reduced, as the collapsed cartridges have a reduced size in comparison to regular non-collapsible cartridges.

On the other hand, once the cartridges have been used, i.e. reduced to the collapsed state by dispensing the filling material, the cartridges are significantly reduced in size and weight in comparison to regular cartridges so that the cost of disposal is also reduced. In any case the carbon footprint associated with the film cartridges is reduced in comparison to plastic cartridges that are completely formed in an injection molding process.

SUMMARY

Multi-layer films are used as cartridge walls because of their superior barrier properties. However, on using a multi-layered film having different layers formed by different materials, media stored in the cartridges can have a negative influence on some of the layers and significantly reduce the storage lifetime of a filled cartridge. Each layer serves a different purpose and thus not every layer may serve as a barrier for every chemical material. So certain aggressive materials that are commonly stored in cartridges, e.g. MMA (methyl methacrylate), may degrade internal layers of the film if they come in direct contact. For most of the surface area this is prevented by using materials for the radially innermost cover layers which are resistant to those aggressive materials. At places where the film is cut, however, the other layers may become exposed to the aggressive material. This may happen in particular at the end face of the front end of the film where the head part is molded onto the usually cylindrical film bag. For this reason particularly the front end of multi layered films need protecting from media (substances) stored in the cartridge chambers.

Moreover, during the manufacture of a film cartridge with an injection molded head, one has to place a cylindrical film over a core that is part of a mold. In matching the diameters of film and core the following problems occur:

Firstly, if the core diameter is too large (but still smaller than the film diameter), it is cumbersome to place the film over the core. Secondly, if the core diameter is too small, the film sits rather loose on the core and may move during injection molding, i.e. become detached from the injection molded head. Thirdly, the diameter of the film has some variance due to manufacturing tolerances.

For this reason it is an object of the invention to make the placement of the film over the core easier and more reliable for a great variety of film diameters that can be used with one and the same core in the same mold of an injection molding tool. It is a further object of the invention to reduce the number of rejected cartridges due to detached injection molded heads. It is yet a further object of the present invention to propose a cartridge of the initially named kind and a method of manufacturing such a cartridge by which the total manufacturing costs can be reduced.

These objects are satisfied by a cartridge for a medium to be dispensed, the cartridge comprising a head part having a dispensing outlet and a film forming a cartridge wall, with the film bounding a cartridge chamber for the medium to be dispensed, extending at least partially in a longitudinal direction of the cartridge and having a front end that is connected to the head part, wherein the film is preferably a multilayer film having at least two layers formed from different materials, and wherein the front end of the film is sealingly and non-releasably embedded in the head part of the cartridge, so that an end face of the front end of the film is covered, in particular completely covered, by the head part.

Providing a cartridge in which the front end of the film is completely embedded in the head part and preferably completely covered by the head part means that the front end of the film that is susceptible to corrosive attacks from substances stored in the cartridge chamber is disposed remote from the cartridge chamber and hence is not accessible to the substances stored therein. The film may e.g. be embedded over a length of 0.5 to 2.5 mm, preferably 1 to 1.5 mm, in particular approximately 1.2 mm, in the longitudinal direction.

By embedding the end face of the front end of the film in the more resistant material of the head part the internal layers of the film are protected. The head part can e.g. be made from one of polypropylene (PP), polyethylene (PE) and polybutylene terephthalate (PBT).

Preferably an outer surface and an inner surface of the film are continuously covered by the head part at least in the region of the end face, with the outer and the inner surface both being arranged directly adjacent to the end face of the front end of the film. This means that in addition to the end face of the film being covered by the head part also parts of the film at either side of the end face are completely covered by the head part to prevent a pathway from being formed in the head part via which substances present in the cartridge could travel to reach the end face of the film.

Advantageously the head part has a collar, the collar surrounding the dispensing outlet in a radially outer region of the head part and extending in the longitudinal direction, with the collar having an inner annular section and an outer annular section with a circumferential groove disposed between the inner annular section and the outer annular section, and wherein the front end of the film is sealingly and non-releasably embedded in the circumferential groove disposed between the inner annular section and the outer annular section.

The provision of a collar provides a stable part at the head part in which the film can be attached to the head part. Moreover, the collar forms an additional boundary between the cartridge chamber and the front end of the film.

It should further be noted that the head part of the cartridge is a stable shaped part, e.g. of injection molded plastic, that forms the front end of the cartridge. The head part is preferably of generally plate-like design, with the collar being formed in the radial outer region of the head part and with the dispensing outlet being formed in the front end within the collar.

Preferably a respective thickness of the film and/or of the inner annular section is at least substantially uniform in a radial direction. In this way a uniform layer of material is present between the film and the cartridge chamber. Moreover, a film of uniform thickness also means that there are no additional strains or stresses introduced into the film forming the cartridge wall that could lead to damages at the cartridge wall.

It is preferred if the inner annular section comprises a plurality of cut outs, wherein a depth of each cut out in the longitudinal direction is less than a depth of the circumferential groove disposed between the inner annular section and the outer annular section.

The provision of such cut outs facilitates the manufacture of the cartridge. Moreover, providing the cut outs such that they have a depth which is less than a depth of the circumferential groove, means that the front end of the film forming the cartridge wall is still protected, i.e. covered and sealed, by the collar having the inner and outer annular sections.

Preferably the outer annular section has a generally round, in particular circular, external shape in cross-section and wherein the outer annular section has a non-uniform radial thickness. The provision of a generally round external shape of the outer annular section means that this can be connected to and/or inserted into a dispenser or a part of a dispenser or in a supporting cartridge in a simple manner.

Advantageously the embedded front end of the film has a corrugated shape in cross-section. Preferably the embedded front end of the film has an undulating shape in cross-section. A corrugated respectively an undulating shape of the front end of the film can be applied by shaping a core for a mold in a corresponding manner. The corrugated respectively the undulating shape permit a core with reduced circumference to be used and hence improve the placement of the film forming the cartridge wall at the core during a manufacturing process.

Advantageously the embedded front end of the film has a polygonal cross-section comprising a plurality of vertices, with each of the plurality of vertices of the polygonal cross-section being aligned with a respective one of the plurality of cut outs. Corresponding shapes of the core at which the front end of the film forming the cartridge wall is attached to the head part can be produced in a simple manner and therefore facilitate the manufacture of cartridges leading to a reduction in cost of production.

It is preferred if at least one projection is formed at an inner surface of the outer annular section and preferably wherein a plurality of projections are provided at the inner surface of the outer annular section, wherein the plurality of projections comprise first projections and second projections with the first and second projections having different shapes, widths and/or diameters in cross-section.

Advantageously at least one of the plurality of cut outs is formed at at least one boundary of the at least one projection. On manufacturing the cartridge protrusions are present at a core of the mold and the cut outs are formed at the position of the corresponding protrusions. By providing the protrusions at the boundaries of recesses that are provided to form the at least one projection, the positioning of the film forming the cartridge wall can be improved at the core ensuring that the end face of the film is completely embedded within the collar of the head part.

These objects are satisfied by a core for a mold for molding and thereby attaching a head part of a cartridge to a film forming a cartridge wall, with the film having a front end, wherein the front end of the film is to be sealingly and non-releasably connected to the head part, the core comprising a cartridge head forming at least one recess formed in the cartridge head forming end at an outer circumferential surface of the core.

The cavity forms a gap between the film forming the cartridge wall and the core into which material used to injection mold the head part can flow in order to embed the front end of the film in the collar of the head part of the cartridge. Embedding the film forming the cartridge wall in the collar of the head part means that the front end of the film that is most prone to corrosive attacks from substances stored in cartridge chambers is no longer accessible by the substances present therein.

The provision of the cavity at the cartridge head forming end further significantly reduces the outer diameter of the core in this region. This simplifies the placement of the film onto the core on molding the head part.

Preferably the cavity is formed by a beveled or recessed outer surface of the core between the end face of the cartridge head forming end and the outer circumferential surface of the core. In this way a shape of an inner surface of a collar of the head part can be designed such that is has a shape tailored to a specific application.

Advantageously the cavity comprises a plurality of protrusions formed therein, with the plurality of protrusions extending in particular radially to the outer circumferential surface of the core.

The provision of a plurality of protrusions in the cavity enables the film forming the cartridge wall to be held such that this extends in parallel to the core and to the longitudinal direction thereof and prevents the front end of the film from being exerted to pressures by the resin used to mold the head part causing the film to fold over into the cavity.

Preferably the plurality of protrusions is set back from the end face of the cartridge head forming end. If the protrusions are set back from the end face and do not extend over the complete length of cavity in the longitudinal direction, then the complete front end of the film can be embedded in the collar of the head part. This means that such a head part does not contain regions where the front end of the film may not be covered by material of the head part.

Advantageously a profile of the cross-section of the cartridge head forming end has a generally rounded shape, a corrugated shape or a generally polygonal shape, in particular a rounded or polygonal shape having at least one recesses formed therein, with at least part of the at least one recess having different shapes, preferably arched or part circular shapes, different widths and/or different diameters in cross-section. Such shapes can be easily produced and enable the formation of a head part having no sharp edges present thereat, with the sharp edges potentially being able to damage the film forming the cartridge wall. Moreover, such shapes provide spaces at the cartridge head forming end of the core in which the film forming the cartridge wall can at least partly be received. Moreover, such shapes can advantageously be used to achieve a reduction in the circumference of the core and to facilitate the placement of the film forming the cartridge wall over the core.

It should be noted in this connection that the at least one recess of the core extends in a uniform manner at least over an extent of the cartridge head forming end in the longitudinal direction of the core. This means that the at least one recess has an at least essentially constant width and depth over a length of the at least one recess with respect to the outer circumferential surface of the core, at least in the region of the cartridge head forming end. It should also be noted that the length of the at least one recess is at least as long as a length of the cartridge head forming end in the longitudinal direction of the core.

It is preferred if the at least one recess extends from an end face of the cartridge head forming end. In this way the at least one recess is present at the very end of the cartridge head forming end. Due to the provision of the at least one recess, the core diameter can be reduced in comparison to prior art cores which facilitates placement of the film over the core. The overall reduction in core diameter is made possible, as the at least one recess enables the film forming the cartridge wall to be tightly pulled and/or stretched around the core circumference by pushing excess material of the film into the at least one recess during a manufacture of the cartridge head. In this way a tight fit of the film on the core is achieved during the injection molding process although the core diameter is reduced in comparison to the prior art cores.

It should be noted in this connection that the at least one recess can extend over a complete axial length of the core.

It should further be noted that the part of the core that does not form part of the cartridge head forming end, and/or regions required at the core to form the head part of the cartridge at the cartridge head forming end, can have a reduced outer diameter in comparison to the cartridge head forming end, with the regions required at the core to form the head part including spaces into which components of a mold used to form the cartridge head at the cartridge head forming end can engage.

In a further aspect the present invention relates to a mold for molding and thereby attaching a head part of a cartridge to a film forming a cartridge wall, the mold comprising a core in accordance with the teaching presented herein, a region forming a head space in which the head part of the cartridge is formed and within which the film is sealingly and non-releasably connected to the head part and at least two sliders adapted to engage the film surrounding the core and to engage the core via the film adjacent to the cartridge head forming end, with the at least two sliders forming a boundary of the head space.

The advantages associated with the core in accordance with the invention likewise hold true for the mold described herein.

In a further aspect the present invention relates to a method of manufacturing a cartridge using a mold in accordance with the teaching described herein, the method comprising the steps of:
  placing the at least one film on the core;
  placing the film and the core in the mold;
  moving the at least two sliders to clamp the film into position by inserting the at least one mold projection of the sliders into the at least one recess of the core and clamping the film between them; and
  injection molding a head part of the cartridge in the head space of the mold to form the head part and to sealingly and non-releasably connect the film to the head part, so that an end face of the front end of the film is covered, in particular completely covered, by the head part.

The advantages associated with the core likewise hold true for the corresponding features of method of manufacturing the cartridge with the present teaching.

BRIEF DESCRIPTION OF THE DRAWINGS

The invention will be explained in more detail hereinafter with reference to the drawings.

FIG. 6 is a perspective view of a first core according to the invention;

FIG. 7 is a perspective view of a second core according to the invention;

DETAILED DESCRIPTION OF THE EMBODIMENTS

Figure 1:
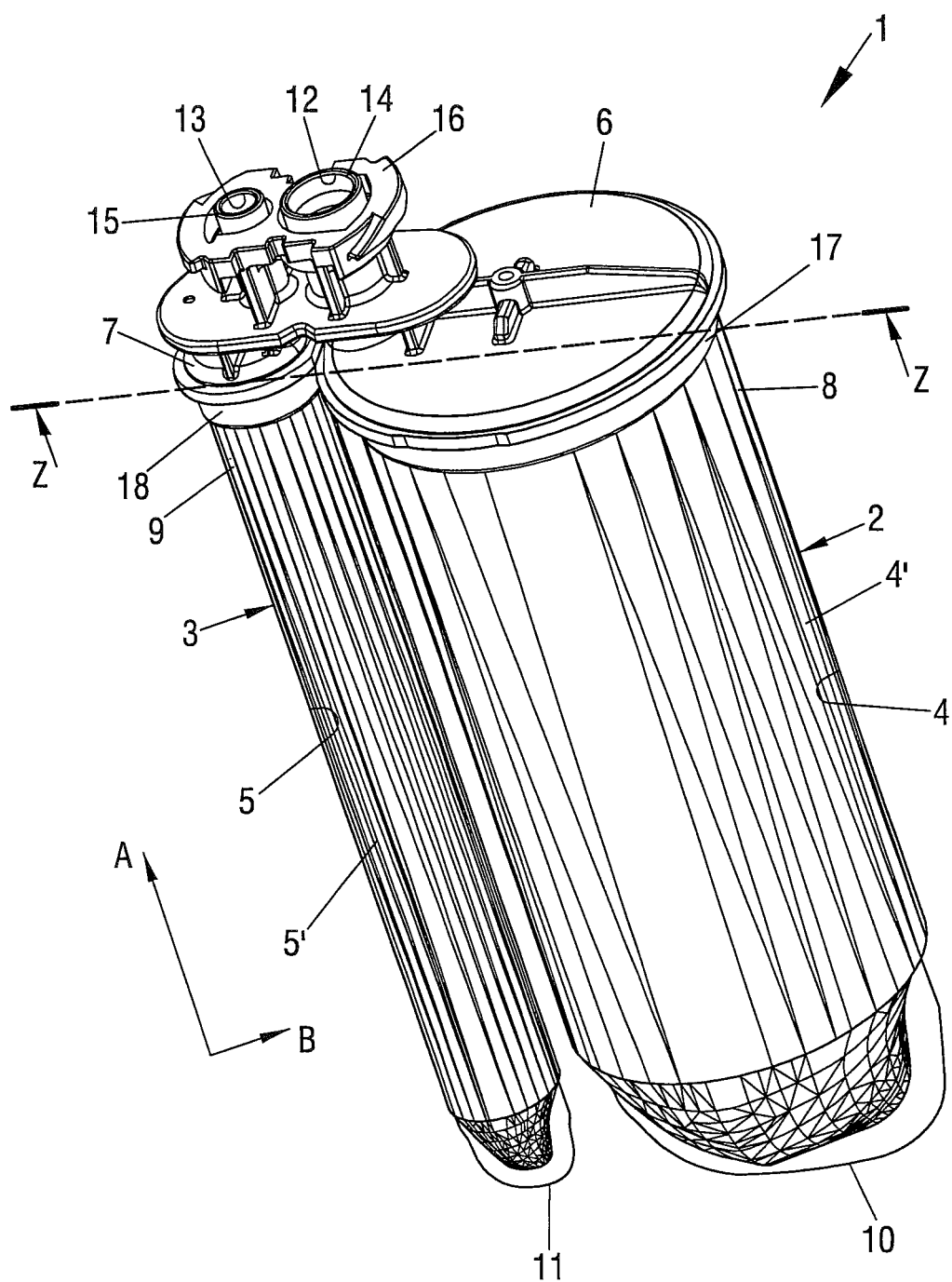
FIG. 1 is a perspective view of a cartridge.

In the following the same reference numerals will be used for parts having the same or equivalent function. Any statements made having regard to the direction of a component are made relative to the position shown in the drawing and can naturally vary in the actual position of application.

FIG. 1 shows a cartridge 1 configured as a two-component cartridge. The cartridge 1 comprises two generally cylindrical cartridge chambers 2, 3. The cartridge chambers 2, 3 are each bound by a cartridge wall 4, 5 as well as by a head part 6, 7, with each head part 6, 7 being arranged at a respective front end 8, 9 of the cartridge wall 4, 5. Each cartridge wall 4, 5 extends in a longitudinal direction A of the cartridge 1 from a respective rear end 10, 11 to the respective front end 8, 9.

Each head part 6, 7 is a stable shaped part of generally plate-like shape and comprises respective dispensing outlets 12, 13 via which a respective medium (not shown) can be dispensed from the cartridge chambers 2, 3. The two dispensing outlets 12, 13 extend from the head parts 6, 7 as outlet passages 14, 15 through a common outlet part 16. A mixing tip or closure part (each not shown) can be connected to the outlet part 16.

Figure 2:
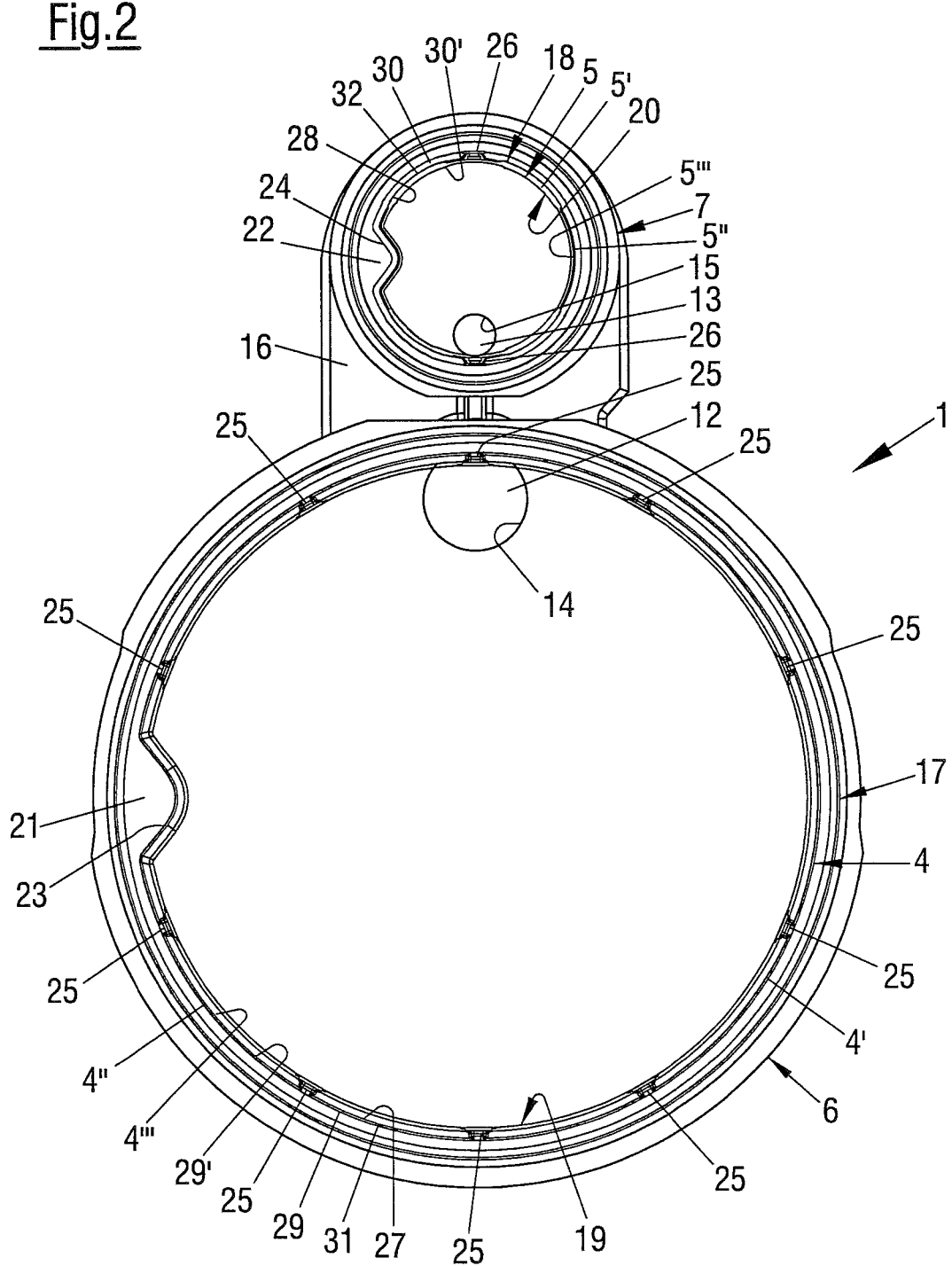
FIG. 2 is a cross-sectional view through the head parts of a cartridge according to a first embodiment of the invention.
Figure 3:
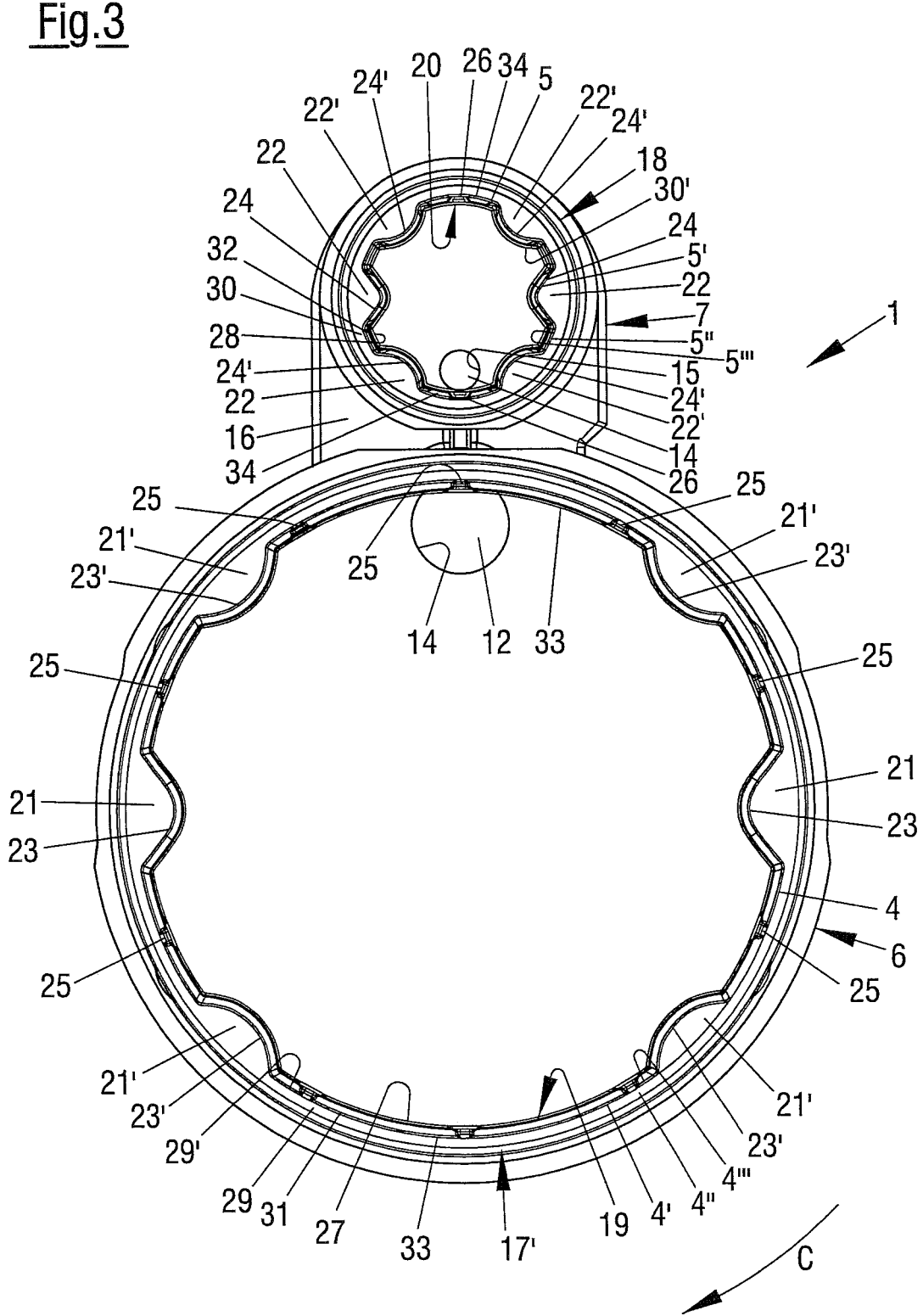
FIG. 3 is a cross-sectional view through the head parts of a cartridge according to a second embodiment of the invention.

Each head part 6, 7 has a collar 17, 18, with each collar 17, 18 surrounding the dispensing outlet 12, 13 in a radially outer region of the head part 6, 7 (see FIGS. 2 and 3). A radial direction B is indicated relative to the arrow A used to identify the longitudinal direction A. Each collar 17, 18 has a length extending in the longitudinal direction A. The front end 8, 9 of each cartridge wall 4, 5 is sealingly and non-releasably connected to the collar 17, 18 of the head part 6, 7.

The cartridge walls 4, 5 are each formed from a film 4', 5'. Each rear end 10, 11 of the cartridge walls 4, 5, formed from the film 4', 5', is welded shut in a sealing manner in the present example to form a film bag.

It should be noted in this connection that the rear end 10, 11 could also be connected to a fixed shaped part (not shown). In this way the cartridge walls 4, 5 could be adapted to permit a movement of a piston (also not shown) within the cartridge walls 4, 5.

It should further be noted in this connection that the film 4', 5' forming the cartridge walls 4, 5 is preferably a multilayer film having at least two layers formed from different materials. Such multi-layer films are used e.g. when particularly aggressive substances are stored in the cartridge 1.

It should also be noted that the film 4', 5', regardless of whether it is a film 4', 5' made from one type of material or a multilayered film made from one or more different types of materials, can have a thickness of at most 0.3 mm, more specifically of at most 0.15 mm, preferably of approximately 0.085 mm.

FIG. 2 shows a cross-sectional view through the head parts 6, 7 of the cartridge 1 according to a first embodiment along a line Z-Z (see FIG. 1). The collar 17, 18 of the respective head part 6, 7 has an inner surface 19, 20 extending in the longitudinal direction A. Each collar 17, 18 inner surface 19, 20 comprises one projection 21, 22 projecting radially inwardly.

The front end 8, 9 of the cartridge wall 4, 5 has a depression 23, 24, with the depression 23, 24 being aligned with the respective projection 21, 22 of the inner surface 19, 20 of the collar 17, 18.

Each projection 21, 22 extends at least substantially over the length of the inner surface 19, 20 of the collar 17, 18 in the longitudinal direction A. In the example shown in FIG. 2, the length of the collar 17, 18 and a length of the projection 21, 22 in the longitudinal direction A may e.g. be approximately 2 to 20 mm, preferably 5 to 7 mm, respectively.

A shape of the projection 21, 22 in cross-section is part triangular with rounded edges and the height of the projection 21 may be selected as approximately 0.4 to 2.5 mm in the radial direction B and the height of the projection 22 may be selected as approximately 0.2 to 2 mm in the radial direction B.

The inner surfaces 19, 20 of the collars 17, 18 comprise respective cut-outs 25, 26 that are spaced apart from one another around the inner surface 19, 20.

The front ends 8, 9 of the cartridge walls 4, 5 that are formed by a film 4', 5' are arranged in the respective collar 17, 18. To this end the respective collar 17, 18 has an inner annular section 27, 28 and an outer annular section 29, 30 with a circumferential groove 31, 32 disposed between the inner annular section 27, 28 and the outer annular section 29, 30. The front end 8, 9 of the film 4', 5' is sealingly and non-releasably embedded in the circumferential groove 31, 32 disposed between the inner annular section 27, 28 and the outer annular section 29, 30. In this way in particular the respective end faces of the front ends 8, 9 of the cartridge walls 4, 5 are completely covered by the material of the head parts 6, 7.

It should be noted in this connection that a depth of each cut out 25, 26 in the longitudinal direction A is less than a depth of the circumferential groove 31, 32 disposed between the inner annular section 27, 28 and the outer annular section 29, 30.

It should further be noted in this connection that the collar 17, 18 could also only comprise one annular section (not shown) in which case the respective front end 8, 9 of the respective cartridge wall 4, 5 could be attached to e.g. the inner surface 19, 20 of the collar 17, 18 rather than to the collar 17, 18 within the circumferential groove 31, 32.

In any event the collar 17, 18 has a generally round, in particular circular, external shape in cross-section in the embodiments shown. It should be noted that the external shape is generally adapted to the shape of the cartridge 1 and that deviations from a round external shape can be selected if a specific design of a cartridge 1 is chosen.

FIG. 3 shows a cross-sectional view through the head parts 6, 7 of a slightly amended cartridge 1 according to a second embodiment of the invention, similar to the cross-sectional view of FIG. 2. In this embodiment the inner surface 19, 20 of the collar 17, 18 of the respective head part 6, 7 comprises a plurality of projections 21, 21', 22, 22' projecting radially inwardly. In fact six projections 21, 21', 22, 22' are provided at each inner surface 19, 20.

These six projections 21, 21', 22, 22' comprise first projections 21, 22 and second projections 21', 22' with the first and second projections 21, 22, 21', 22' having different shapes and dimensions e.g. widths and heights.

The second projections 21', 22' are part cylindrical in shape and the height of the projection 21' may be selected as approximately 0.2-2.3 mm in the radial direction B and the height of the projection 22' may be selected as approximately 0.2-2 mm in the radial direction B. The length of the second projections 21', 22' may be selected as approximately 2-20 mm, preferably 5-7 mm, in the longitudinal direction A. The dimensions of the first projections 21, 22 correspond to those mentioned with regard to FIG. 2.

The plurality of projections 21, 22, 21', 22' is non-uniformly distributed around the inner surface 29', 30' of the outer annular section 29, 30. In fact the first and second projections 21, 22, 21', 22' are provided as pairs of projections 21, 22, 21', 22', with each member of each pair of projections 21, 22, 21', 22' being oppositely disposed at the inner surface 29', 30' of the outer annular section 29, 30 of the collar 17, 18. It should be noted that an odd number of pairs of projections 21, 22, 21', 22' is provided in the present instance, with a respective pair of second projections 21', 22' being arranged either side of the pair of first projections 21, 22.

The collar 17, 18 of each head part 6, 7 has two oppositely disposed sections 33, 34 that extend in a circumferential direction C of the collar 17, 18 and that have an at least substantially uniform thickness. The two oppositely disposed sections 33, 34 having a uniform thickness are arranged between two members of oppositely disposed pairs of second projections 21', 22'.

Figure 4:
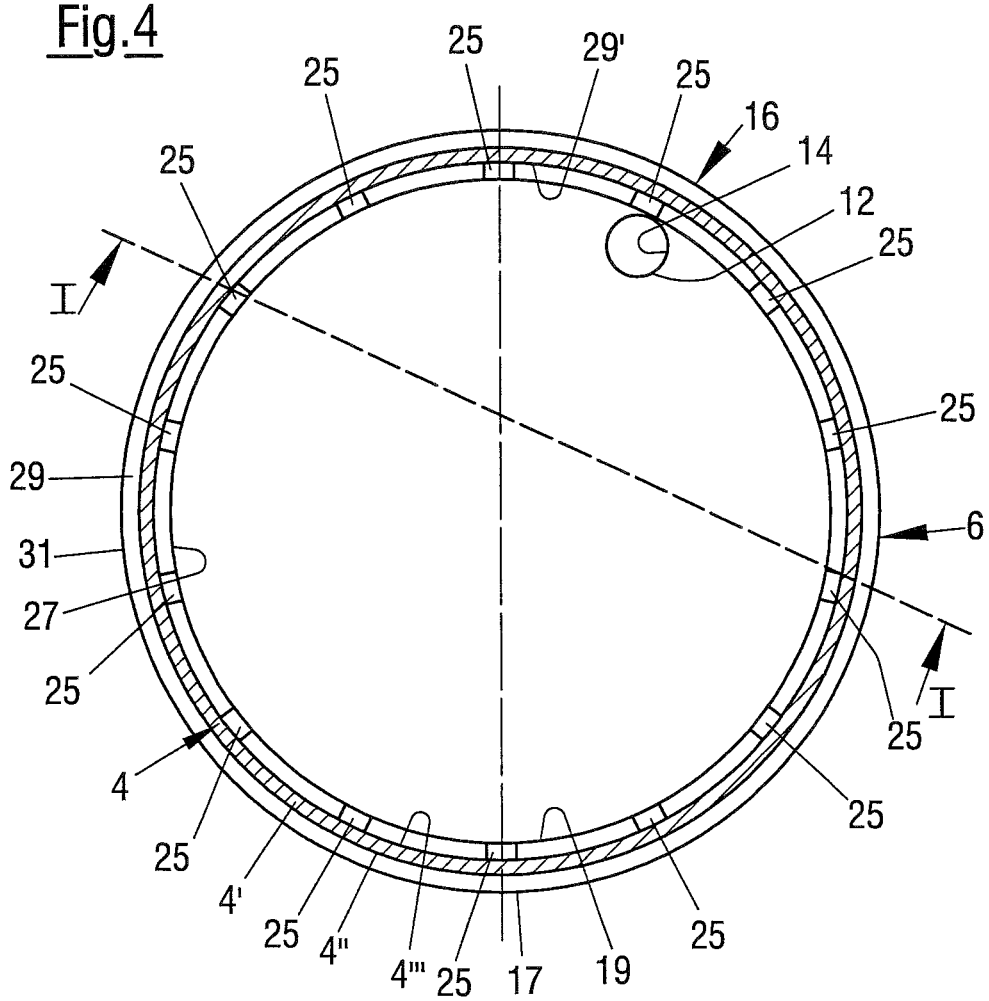
FIG. 4 is a cross-sectional view through a head part of a cartridge according to a third embodiment of the invention.

FIG. 4 shows a cross-sectional view through the head part 6 of a slightly varied cartridge 1 according to a third embodiment of the invention, similar to the cross-sectional views of FIGS. 2 and 3. In this embodiment the collar 17 of the outlet part 16 is free of projections. The inner annular section 27 of the collar 17 has a plurality of cut outs 25 present therein. The head part 7 not shown in FIG. 4 can be designed correspondingly.

It should be noted that in a view along the longitudinal direction A onto the head parts 6, 7, the inner and outer annular sections 27, 28, 29, 30 have a generally circular shape.

In the embodiments of FIGS. 2 and 3 both of the outer annular sections 29, 30 comprise projections 21, 22 so that the shape of the outer annular sections 29, 30 deviates from the circular shape in the region of the projections 21, 22. In this way the outer annular sections 29, 30 have an undulating shape. The inner annular sections 27, 28 correspondingly deviate from a generally circular path in the region of the projections present in the outer annular sections 29, 30. Hence the inner and outer annular sections 27, 28, 29, 30 have a shape that generally follows a circular path around the longitudinal direction A, but comprise undulations about this circular path. The inner and outer annular sections 27, 28, 29, 30 of the embodiments shown in FIGS. 2 and 3 consequently deviate from a perfectly circular shape.

In contrast to this no projections are present in the outer annular section 29, 30 of the embodiment shown in FIG. 4, so that the inner and outer annular sections 27, 28, 29, 30 of the embodiment shown in FIG. 4 have a circular shape viewed along the longitudinal direction A.

Figure 5:
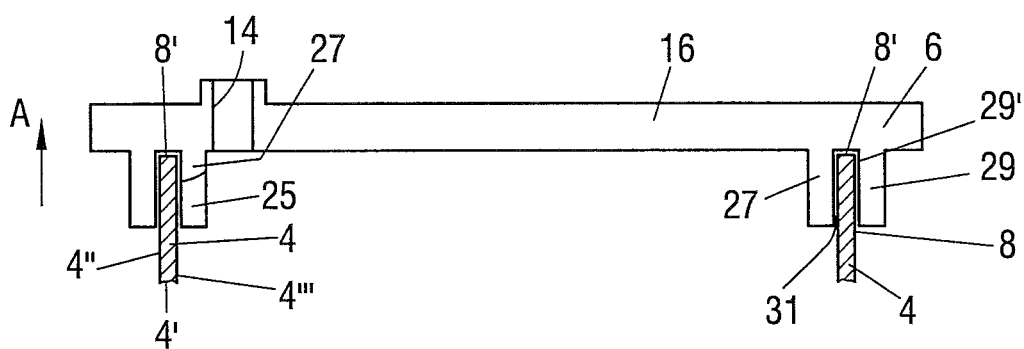
FIG. 5 is a section through the head part of FIG. 4.

FIG. 5 shows a sectional view through the outlet part 16 of FIG. 4 along the sectional line I-I. The cartridge wall 4 is arranged in the circumferential groove 31 of the collar 17 between the inner annular section 27 and the outer annular section 29 such that the front end 8 of the film 4' forming the cartridge wall 4 is sealingly and non-releasably embedded in the collar 17.

On the left hand side of FIG. 5 the inner annular section 27 is indicated, this shows that the depth of the cut out 25 in the longitudinal direction A is less than the depth of the circumferential groove 31 disposed between the inner annular section 27 and the outer annular section 29.

FIG. 5 further shows that the end face 8' of the front end 8 of the film 4' is completely covered by the head part 6 and is thereby non-releasably embedded in the head part 6. Likewise the outer surface 4" and the inner surface 4'" of the film 4' are continuously covered by the head part 6 in the region of the end face 8', with the outer and the inner surface 4", 4'" both being arranged directly adjacent to the end face 8' of the front end 8 of the film 4'. The same holds true for the film 5' which is not shown in FIG. 5.

FIG. 6 shows a first embodiment of a core 35 for a mold for molding and thereby attaching a head part 6, 7 of a cartridge 1 to a film 4', 5' forming a cartridge wall 4, 5. The core 35 comprises a cartridge head forming end 36. A plurality of recesses 37 is formed in the cartridge head forming end 36 at an outer circumferential surface 38 of the core 35. The plurality of recesses 37 extends in a longitudinal direction A of the core 35. In a top view of the core 35 in the longitudinal direction A, a profile of the cross-section of the cartridge head forming end 36 has a corrugated shape, in particular a star shaped cross-section.

It should be noted in this connection that the longitudinal direction A of the core 35 coincides with the longitudinal direction A of the cartridge 1.

The plurality of recesses 37 extends from an end face 39 of the cartridge head forming end 36 in the longitudinal direction A. A shape of a cross-section of each of the plurality of recesses 37 is part cylindrical. Each recess 37 has an elongate shape having a length in the example of FIG. 6 of e.g. approximately 25 mm in the longitudinal direction A. A depth of each recess 37 from the outer circumferential surface 38 of the core 35 may be approximately 0.4-3 mm in the radial direction B of the core 35 which coincides with the radial direction B of the cartridge 1. The widths of the recesses 37 in the circumferential direction may be selected in the range of 2 mm to 15 mm, preferably 4 mm to 9 mm.

The core 35 further comprises a cavity 40 extending between the outer circumferential surface 38 of the core 35 and the end face 39. The cavity 40 circumferentially extends around the core 35 in the circumferential direction C and throughout the plurality of recesses 37. A length of the cavity 40 may be approximately 5-20 mm in the longitudinal direction A and a depth of the cavity may be approximately 0.5-1.5 mm in the radial direction B.

A plurality of protrusions 41 are arranged in the cavity 40. The plurality of protrusions 41 are specifically arranged at an outer boundary of each recess 37. The plurality of protrusions 41 projects towards the outer circumferential surface 38. The plurality of projections 41 is set back from the end face 39 and from the outer circumferential surface 38. Alternatively, the plurality of projections 41 may be flush with the outer circumferential surface 38. In the embodiment shown in FIG. 6, each of the plurality of protrusions 41 has a rectangular shape at their side projecting towards the outer circumferential surface 38.

FIG. 7 shows a second embodiment of a core 35 in which the cartridge head forming end 36 is designed in order to produce the head part 4 shown in FIG. 3. To this end the plurality of recesses comprises first recesses 37 and second recesses 37'.

The first and second recesses 37, 37' have different shapes and diameters, with the shape of the recesses 37, 37' corresponding to the shapes of the projections 21, 21' shown in FIG. 3. This means that the first recesses 37 shown in FIG. 7 have a part triangular shape with rounded edges in cross-section and the second recesses 37' have a part cylindrical shape in cross-section.

In this way the profile of the cross-section of the cartridge head forming end 36 has a rounded shape having recesses 37, 37' formed therein, with the recesses 37, 37' having different shapes, namely arched and part circular shapes. A depth of the first recesses 37 may be selected as approximately 0.4-2.5 mm and a depth of the second recess 37' may be selected as approximately 0.2-2.3 mm in the radial direction B. The cartridge head forming end 36 also has two oppositely disposed sections 42 that are free of recesses. The width of the first recesses 37 and/or of the second recesses 37' in the circumferential direction may be selected in the range of 2 mm to 15 mm, preferably 4 mm to 9 mm.

The protrusions 41 of FIG. 7 extend to the outer circumferential surface 38 where they are flush with the outer circumferential surface 38. Like with regard to FIG. 6 the protrusions 41 shown in FIG. 7 are set back from the end face 39 and have a rectangular shape at their side which lies in the outer circumferential surface 38.

The first and second protrusions 41, 41' have surfaces that merge with the outer circumferential surface 38 in order to facilitate a positioning of the front end 8, 9 of the film 4', 5' forming the cartridge wall 4, 5. By forming the protrusions such that they merge with a contour of the outer circumferential surface 38 of the core 35, these permit the front end 8, 9 of the film 4', 5' and more specifically the end face 8', 9' of the film 4', 5' forming the cartridge wall 4, 5 to be embedded in the material of the collar 17, 18 of the corresponding head part 6, 7.

Figure 8:
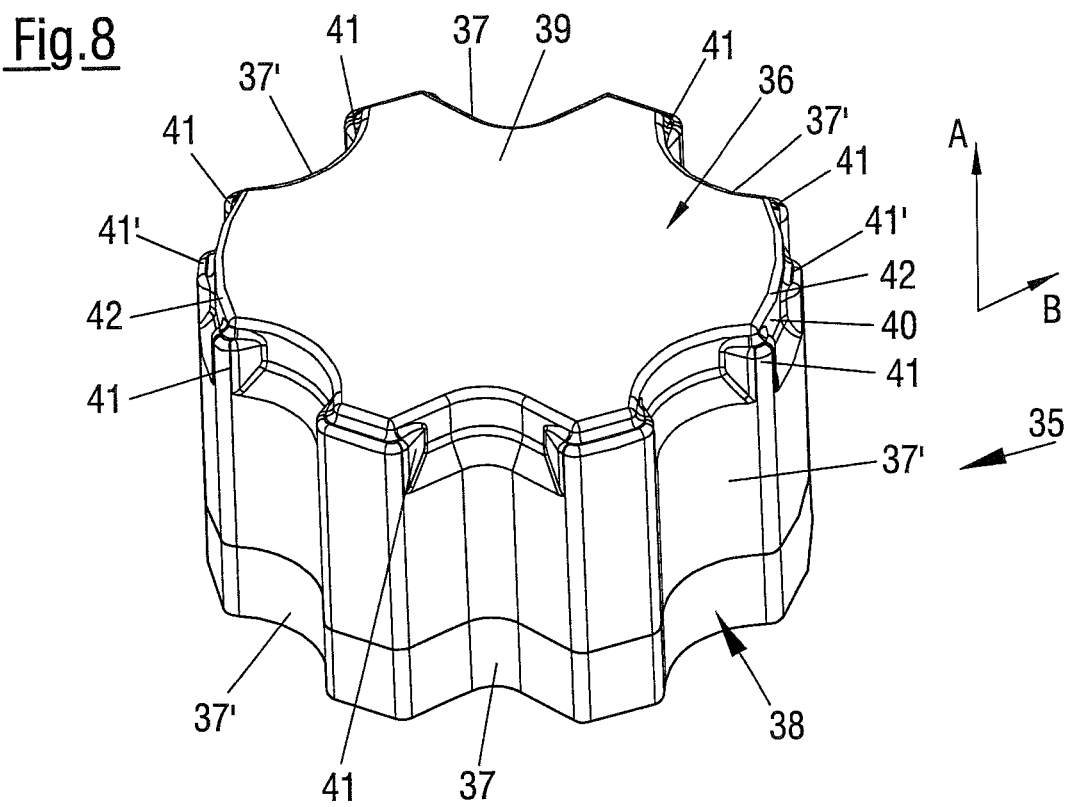
FIG. 8 is a perspective view of a third core according to the invention.

FIG. 8 shows a third embodiment of a core 35. The difference between the core 35 of FIG. 8 and that shown in FIG. 7 is that the core 35 of FIG. 8 comprises first and second types of protrusions 41, 41'. The first protrusions 41 are arranged at the boundaries between adjacent recesses 37, 37' and the second protrusions 41' are arranged in the cavity 40 in the two oppositely disposed sections 42 that are free of recesses. The first protrusions 41 also extend into the recesses 37, 37'.

Figure 9:
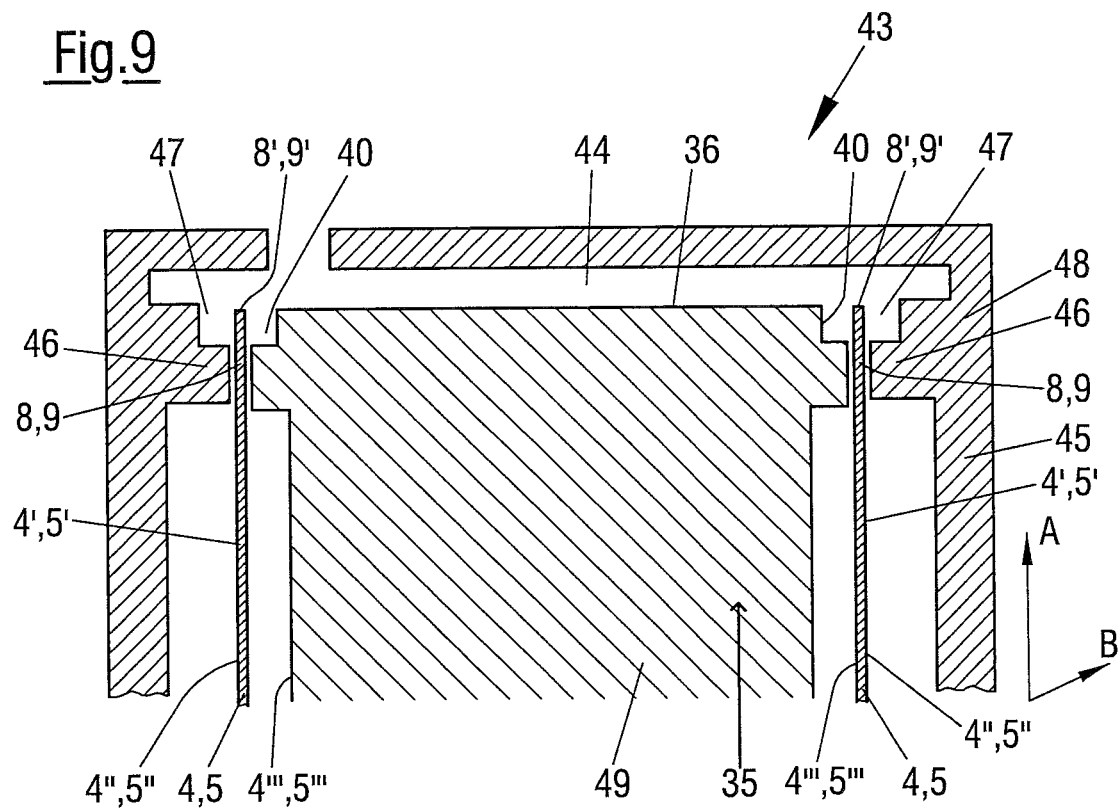
FIG. 9 is a part sectional view of a mold according to the invention.

FIG. 9 shows a section through a part of a mold 43 for molding the head part 6 of the cartridge 1 of FIG. 3. A similar mold 43 can be provided for molding the head part 7 of the cartridge 1 of FIG. 3. The mold 43 comprises the core 35 shown in FIG. 7 and a region forming a head space 44 in which the head part 6 of the cartridge 1 shown in FIG. 3 is formed. During a molding process the film 4', 5' forming the cartridge wall 4 is sealingly and non-releasably connected to the head part 6. In particular the end face 8', 9' of the film 4', 5' as well as the inner and outer surface 4", 4'", 5", 5'" of the film 4', 5' at its front end 8, 9 is completely covered with material forming the head part 6, 7 in a mold 43 such as the one shown in FIG. 9.

The mold 43 is composed of two half shells of which only one half shell 45 can be seen in FIG. 9. Each half shell includes a portion acting like a circumferentially extending slider 46. The circumferentially extending slider 46 engages all of the film 4', 5' surrounding the core 35 that is present in the half shell 45 at a position of the slider 46. The slider 46 thereby also engages the core 35 that is present in that half shell 45 via the film 4', 5'.

In particular the slider 46 engages the core 35 directly adjacent to the cartridge head forming end 36 of the core 35. In use the two portions forming sliders form a lower boundary of the head space 44.

The core 35 further comprises a section 49 of reduced outer diameter. The section 49 of reduced outer diameter is arranged directly adjacent to the cartridge head forming end 36 of the core 35. The section 49 of reduced outer diameter extends from the cartridge head forming end 36 to the other end (not shown) of the core 35. In use this section 49 of reduced outer diameter permits the film 4', 5' to be more easily placed over this part of the core 35 prior to the molding of the head part 6, 7 of the cartridge 1.

Moreover, an annular recess 47 is present in the half shell 45. In use of the mold 43 the space formed between the annular recess 47, the slider 46 and the film 4', 5' forming the cartridge wall 4 forms the part of the mold 43 responsible for forming the outer annular section 29 of the collar 17.

Likewise the space formed in the cavity 40 of the head forming end 36 between the film 4', 5' forming the cartridge wall 4 and the core 35 forms that part of the mold 43 responsible for forming the inner annular section 27 of the collar 17. In order to produce the head part e.g. shown in FIG. 3, each slider 46 can have three mold projections (not shown) that have a shape that respectively corresponds to the shape of the first and second projections present at the collar 17. These mold projections of the slider 46 engage the film 4', 5' at the position of the recesses 37, 37' of the core 35 of FIG. 7.

During manufacture of the head part 6 of the cartridge 1, the film 4', 5' forming the cartridge wall 4, 5 is placed on the core. The film 4', 5' and the core 35 are subsequently placed into the mold 43 and the two sliders 46 are moved towards one another to clamp the film 4', 5' into position by inserting the mold projections of the slider 46 into the recesses 37, 37' of the core 35 and clamping the film 4', 5' forming the cartridge wall 4 between them. Thereafter the head part 4 is injection molded in the head space 44 of the mold 43 to form the head part 4 and to sealingly and non-releasably connect the film 4', 5' to the head part 4.

On moving the two sliders 46 towards one another, the mold projections push the film 4', 5' into the recesses 37, 37' to collect any slack that may be present in the film 4', 5', in particular to remove any film 4', 5' that may be present in the region of the contact surfaces 48 of the sliders 46 of the mold 43. In this way a tight fit of the film 4', 5' to the core 35 is ensured on closing the mold 43. In order to ensure that any slack of the film 4', 5' forming the cartridge wall 4, 5 is collected and that the strain exerted on the film 4', 5' on moving the sliders 46 together is ideally selected the shape and size of the recesses 37, 37' have to be dimensioned appropriately.

The pushing of the film 4', 5' against the core 35 is achieved by the respective mold projections of the sliders 46 that close in on the core 35 from opposite sides. Conventionally, this would have been half-circles. In accordance with the present teaching the sliders 46 may comprise the mold projections that have shapes matching the core 35 with its recesses 37, 37'. Such a contact needs to be well established over the full circumference, since the two sliders 46 also close off the head space 44.

It should also be noted that the depressions 23, 23', 24, 24' present in the front end 8, 9 of the film 4', 5' after molding are formed due to the respective mold projections shifting some of the film 4', 5' into the recesses 37, 37' (see FIG. 3). The material of the film 4', 5' that forms the depressions 23, 23', 24, 24' is moved in particular away from the region of the contact surfaces 48 thereby ensuring that no material of the film 4', 5' can be trapped between two contact surfaces 48 of the mold 43.

Due to the direction of movement of the sliders 46, not all shapes of recesses 37, 37' are possible at all positions. Certainly one would be able to use all sorts of shapes with increasing number of parts and more complex movements, as is the case with the core 35 shown in FIG. 6. But in order to keep the manufacturing costs low, a two-slider-configuration is ideal. For this reason no recess 37, 37' is provided at the contact points of the half shells 45 (sliders 46), but rather sections 42 without recesses 37, 37' are provided at this part of the core 35.

As the point of contact of the two half shells 45 is prone to the risk of jamming some of the film 4', 5' forming the cartridge wall 4 between the sliders 46, the first recesses 37 are provided with a larger depth than the second recesses 37'. In this way the first recesses 37 are engaged first by corresponding projections of the sliders 46 (not shown) such that the film 4', 5' is tensioned and pulled away from the point of contact of the two half shells 45.

This means that a deeper recess 37 is provided at a 90 degree position (see FIG. 7) with respect to a contact surface 48 between two sliders 46 in a two slider configuration, such that the projection of the slider 46 at the 90 degree position is more pronounced compared to the other projections and that the projection at the 90 degree position makes contact with the film 4', 5' first there and pulls it away from the contact surface of the two half shells 45.

There is a degree of freedom regarding the number of recesses 37, 37' provided in the core 35 and their depth. In the simplest case one rather deep recess 37 is provided (see the corresponding head part in FIG. 2). In other embodiments, such as the ones shown in FIGS. 6 to 8, a plurality of recesses 37, 37' is provided that are shallower compared to the embodiment in which only one recess 37 is provided.

On providing a plurality of recesses 37, 37', one has to be aware that fine structures have to be avoided due to manufacturing issues at the mold 43 (avoidance of too small radii) and risks of tearing the film 4', 5' at sharp corners.

On the other hand, the provision of too few recesses 37, 37' means that these need to be deeper. Deeper recesses 37, 37', however, lead to projections 21, 22 having a height which is too large and these can be in conflict with a circular piston (not shown) pushing the film 4', 5' forming the cartridge wall 4, 5 towards the head part 6, 7.

A larger height of the projections 21, 22 means that these project further in the radial direction B away from the collar 17, 18 of the cartridge 1, hence blocking the movement of the piston on the last millimeters before reaching the head part 6, 7.

It has been discovered that the number of recesses 37, 37' can range between 2 and 10 (i.e. 1 to 5 per half circle). Selecting an odd number of recesses 37, 37' per half circle around the core 35 enables the use of one deeper projection on each slider 46 at a 90 degree angle to the contact point of the sliders 46 enabling the previously discussed effect of pulling the film 4', 5' away from said contact surface 48.

It should be noted in this regard, that the core 35 can be formed without any recesses 37, 37' in the circumferential surface 38. In this way the sliders 46 of the corresponding mold 43 would also be formed without any mold projections that would interact with such recesses 37, 37'. In this case the corresponding mold 43 clamps the film 4', 5' between the sliders 46 and the core 35 without pulling the film 4', 5' away from the contact surfaces 48 of the mold 43.

The embodiments of the core 35 shown in the foregoing are respectively provided with a plurality of protrusions 41, 41'. These protrusions 41, 41' act as spacer elements in the mold 43 and enable the front end 8, 9 of the film 4', 5' forming the cartridge wall 4, 5 to be aligned at least substantially in parallel along the longitudinal direction A. As shown in FIG. 9, the inner annular section 27, 28 can be formed between the film 4', 5' and the core 35 due to these protrusions 41, 41' which maintain a position of the front end 8, 9 of the film 4', 5'. In this way the front end 8, 9 of the film 4', 5' is embedded in a sealing and non-releasable manner within the collar 17, 18 of the head part 6, 7.

It should be noted in this connection that a shape of the cut-outs 25, 26 present in the collar 17, 18 of the respective head part 6, 7 corresponds to a shape of the respective protrusion 41, 41' present at the core. These protrusions 41, 41' are required in order to guarantee a space present at either side of the film 4', 5' forming the cartridge wall 4, 5 during the injection molding process such that the resin used to form the respective head part 6, 7 can flow around both sides of the film 4', 5' so that an end face of the film 4', 5' is covered by the resin and hence subsequently protected by the head part. This is particularly beneficial when multi-layered films are used as the cartridge wall 4, 5. This is because some of the different materials used in a multi-layered film may be susceptible to the materials to be stored in the cartridge chamber 2, 3. Embedding the front end 8, 9 of the cartridge wall 4, 5 in the head part 6, 7 means that the material stored in the chamber 2, 3 cannot come into contact with e.g. a middle or outer layer of a multi-layered film 4', 5' forming the cartridge wall 4, 5.

Without these protrusions the pressures present during the injection molding process could push the front end 8, 9 of the film 4', 5' forming the respective cartridge wall 4, 5 into the respective cavity 40 such that the front end 8, 9 of the film 4', 5' is sealingly and non-releasably connected to the collar 17, 18 of the head part 6, 7. This connection would then be formed between the inner surface 19, 20 of the collar 17, 18 and the film 4', 5' forming the cartridge wall 4, 5. In this way the front end 8, 9 of the film 4', 5' and in particular its end face 8', 9' would still be accessible to media stored in the respective cartridge chambers 2, 3 which is to be avoided.

It should be noted that a film 4', 5' having an undulating structure (not shown) could be used in an outlet part 16 such as the one shown in FIG. 5. This is because the undulating structure could improve the stiffness of the film 4', 5' on a manufacture of the head part 6, as it would prevent the film 4', 5' from being displaced in the direction of the cavity 40 of the corresponding core 35 (see e.g. FIG. 9) on injection molding. In this way not protrusions 41, 41' would necessarily be required.

The invention claimed is:

1. A cartridge for a medium to be dispensed, comprising: a head part having a dispensing outlet and a film forming a cartridge wall, the film bounding a cartridge chamber for the medium to be dispensed, extending at least partially in a longitudinal direction of the cartridge and having a front end connected to the head part, the film being a multilayer film having at least two layers formed from different materials, and the front end of the film is sealingly and non-releasably embedded in the head part of the cartridge, so that an end face of the front end of the film is covered by the head part, the head part having a collar surrounding the dispensing outlet in a radially outer region of the head part and extending in the longitudinal direction, with the collar having an inner annular section and an outer annular section with a circumferential groove disposed between the inner annular section and the outer annular section, and the front end of the film sealingly and non-releasably embedded in the circumferential groove disposed between the inner annular section and the outer annular section, and the inner annular section comprising a plurality of cut outs, and a depth of each cut out in the longitudinal direction being less than a depth of the circumferential groove disposed between the inner annular section and the outer annular section.

2. The cartridge in accordance with claim 1, wherein an outer surface and an inner surface of the film are continuously covered by the head part at least in the region of the end face, with the outer and the inner surface both being arranged directly adjacent to the end face of the front end of the film.

3. The cartridge in accordance with claim 1, wherein a respective thickness of the film or of the inner annular section is uniform in a radial direction.

4. The cartridge in accordance with claim 1, wherein the outer annular section has a round external shape in cross-section and the outer annular section has a non-uniform radial thickness.

5. The cartridge in accordance with claim 1, wherein the embedded front end of the film has a corrugated shape in cross-section.

6. The cartridge in accordance with claim 5, wherein the embedded front end of the film has an undulating shape in cross-section.

7. The cartridge in accordance with claim 1, wherein the embedded front end of the film has a polygonal cross-section comprising a plurality of vertices, with each of the plurality of vertices of the polygonal cross-section being aligned with a respective one of the plurality of cut outs.

8. The cartridge in accordance with claim 1, wherein at least one projection is formed in an inner surface of the outer annular section and preferably wherein a plurality of projections are provided in the inner surface of the outer annular section, the plurality of projections comprising first projections and second projections, with the first and second projections having different shapes, widths and/or diameters in cross-section.

9. The cartridge in accordance with claim 8, wherein at least one of the plurality of cut outs is disposed at least one boundary of the at least one projection.

10. The cartridge in accordance with claim 8, wherein the at least one projection includes a plurality of projections disposed on the inner surface of the outer annular section, the plurality of projections comprising first projections and second projections, with the first and second projections having different shapes, widths or diameters in cross-section.

* * * * *